US00RE38983E

(19) United States
(12) Reissued Patent
Antonious

(10) Patent Number: US RE38,983 E
(45) Date of Reissued Patent: Feb. 14, 2006

(54) GOLF CLUB SHAFT AND INSERT THEREFOR

(75) Inventor: Anthony J. Antonious, Sarasota, FL (US)

(73) Assignee: Adams Golf IP, LP, Plano, TX (US)

(21) Appl. No.: 09/545,111

(22) Filed: Apr. 6, 2000

Related U.S. Patent Documents

Reissue of:
(64) Patent No.: 5,735,752
Issued: Apr. 7, 1998
Appl. No.: 08/487,247
Filed: Jun. 13, 1995

(51) Int. Cl.
*A63B 53/12* (2006.01)

(52) U.S. Cl. ..... 473/317; 473/318
(58) Field of Classification Search ..... 473/316, 473/317, 318, 319, 320, 321, 322, 323, 305, 473/307, 314, 219, 223, 310, 232, 226, 457
See application file for complete search history.

(56) References Cited

U.S. PATENT DOCUMENTS

| | | | | |
|---|---|---|---|---|
| 695,579 | A | * | 3/1902 | Parmele |
| 1,418,039 | A | * | 5/1922 | Tousey |
| 1,426,202 | A | | 8/1922 | Lard |
| 1,428,015 | A | * | 9/1922 | Dienner |
| 1,565,070 | A | * | 12/1925 | Edwards |
| 1,586,469 | A | | 5/1926 | Revell |
| 1,774,385 | A | | 8/1930 | Lard |
| 1,968,616 | A | | 7/1934 | Oldham |
| 1,985,427 | A | * | 12/1934 | Richardson |
| 2,250,429 | A | | 7/1941 | Vickery |
| 2,464,850 | A | | 3/1949 | Crawshaw |
| 3,206,205 | A | | 9/1965 | McLoughlin |
| 3,317,211 | A | * | 5/1967 | Debski |
| 3,341,202 | A | * | 9/1967 | Stars |
| D236,735 | S | * | 9/1975 | Bush |
| 3,963,239 | A | * | 6/1976 | Fujii |
| D245,441 | S | * | 8/1977 | Middlestadt |
| 4,157,181 | A | | 6/1979 | Cecka |
| 4,555,111 | A | * | 11/1985 | Alvarez |
| 4,836,545 | A | | 6/1989 | Pompa |
| 5,022,652 | A | * | 6/1991 | Fenton |
| 5,083,780 | A | | 1/1992 | Walton et al. |
| 5,184,819 | A | | 2/1993 | Desbiolles |
| 5,205,561 | A | * | 4/1993 | Lux |
| 5,226,652 | A | * | 7/1993 | Sato |
| 5,253,867 | A | | 10/1993 | Gafner |
| 5,259,614 | A | | 11/1993 | Greer |
| 5,277,423 | A | | 1/1994 | Artus |
| 5,294,119 | A | | 3/1994 | Vincent et al. |
| 5,297,791 | A | * | 3/1994 | Negishi |
| 5,316,299 | A | * | 5/1994 | Feche et al. |
| 5,335,909 | A | | 8/1994 | Green, Jr. |
| 5,354,056 | A | * | 10/1994 | Cornish |
| 5,362,048 | A | * | 11/1994 | Haste |
| 5,390,921 | A | | 2/1995 | De Ruyter |
| 5,465,959 | A | | 11/1995 | Cheng |
| 5,485,948 | A | * | 1/1996 | McCrink |
| 5,499,814 | A | | 3/1996 | Lu |
| 5,692,970 | A | | 12/1997 | Nelson |
| 5,857,923 | A | | 1/1999 | Veller |

FOREIGN PATENT DOCUMENTS

| | | | | |
|---|---|---|---|---|
| CA | 532592 | * | 11/1956 | ..... 273/85 R |
| GB | 22968 | * | of 1903 | ..... 273/80 R |
| GB | 1819 | * | of 1915 | ..... 273/80.3 |
| GB | 451584 | * | 8/1936 | ..... 273/80 C |
| GB | 452584 | * | 8/1936 | ..... 273/80 C |
| GB | 471020 | * | 11/1956 | ..... 273/80 B |

* cited by examiner

*Primary Examiner*—Sebastiano Passaniti
(74) *Attorney, Agent, or Firm*—Welsh & Flaxman

(57) ABSTRACT

Golf clubs, golf shafts, and inserts for golf club shafts have a coil or coil-type insert for enhancing swing weight control, stiffness and flex control, shock absorption and vibration elimination or reduction. The insert has a central section and a pair of couplers integrally formed on opposite ends of the central section to attach to the shaft or club head.

51 Claims, 10 Drawing Sheets

GOLF CLUB SHAFT AND INSERT THEREFOR

Matter enclosed in heavy brackets [ ] appears in the original patent but forms no part of this reissue specification; matter printed in italics indicates the additions made by reissue.

BACKGROUND OF THE INVENTION

The present invention relates to golf clubs, golf shafts, and inserts for golf club shafts, and, in particular, to an improved golf club shaft having a coil or coil-type insert for enhanced swing weight control, stiffness and flex control, shock absorption, vibration elimination or reduction, and other club improvements.

Conventional golf club shafts are made of steel, metal alloys, or composite materials. Shafts have a tapered shape starting from the smaller tip end to the larger butt end and are normally formed with a continuous variable dimensional difference along the entire length of the shaft.

When a golfer hits a shot, the shaft is subjected to a number of complex forces during the swing, at impact, and during the follow through. Generally, conventional shafts have limited control over the swing weight of the club or the control of the torsion applied to the shaft during the swing. Similarly, conventional shafts do not control or adequately eliminate shock and vibration that transfer through the shaft to the golfer's hands, particularly at impact. Furthermore, conventional shafts have limited means to properly control the stiffness and the flexing of the shaft during the swing and therefore do not provide optimum shot control, power transfer, and accuracy.

It is known that the stiffness and/or flexibility of the shaft as well as the flex points thereon can be varied to at least some degree to better fit the shaft to the physical parameters and swing characteristics of a particular golfer. However, the physical characteristics of conventional shafts and the costs associated with producing a properly "fitted" shaft obviously limits the degree to which a particular golfer can obtain or afford the best possible shaft for his or her swing.

There are a number of prior art patents dealing with shaft flexibility and variations in flex point. Some prior art patents of interest relating to golf shafts are shown in Design Pat. No. 236,735 to Bush, U.S. Pat. No. 5,022,652 to Fenton, British Patent No. 471,020, to TRI-ON, and U.S. Pat. No. 5,316,299 to Feshe et al. In the inventor's opinion, these patents and the described inventions have not satisfied the need for a shaft or the combination of a shaft and club head which provides the most optimum characteristics, at an affordable price range for the majority of golfers worldwide.

SUMMARY OF THE INVENTION

Among the objects of the present invention is to provide a golf club shaft which performs better at a relatively similar cost to conventional golf club shafts. Another object of the present invention is to provide a golf club shaft having a visible coil or coil-type insert, the combined shaft and insert allowing the selective location of the flex-point along the length of the shaft and the selective control of the stiffness of the shaft. Another object is to provide a shaft insert which can be used to more precisely alter the swing weight of a club. Yet another object is to provide a shaft insert which absorbs shock and greatly reduces or eliminates vibration caused by ground contact or impact with the ball. Still another object of the present invention is the provision of a golf club shaft having an insert which controls and generates torsional forces which combine with centrifugal forces to increase club head speed as the club head is swung to strike a golf ball.

Other objects and advantages of the present invention will become apparent from the following detailed description when viewed in conjunction with the accompanying drawings, which set forth certain embodiments of the invention. The objects and advantages of the invention will be realized and attained by means of the elements and combinations particularly pointed out in the appended claims.

To achieve the objects and in accordance with the purpose of the invention, as embodied and broadly described herein, the invention comprises a golf club shaft for a golf club head comprising at least one tubular section and an insert attached to at least one tubular section for regulating the flexibility of said shaft, the insert having a central section and a pair of couplers integrally formed on opposite ends of the central section, at least one of the couplers being attached to the shaft.

To achieve the objects and in accordance with the purposes of the invention, as embodied and broadly described herein, the invention also comprises a golf club comprising a golf club head, a shaft interconnected at one end to the golf club head and at the opposite end to a grip and means for regulating the swing weight and flex point of club, said means including an insert having a central section and at least one coupler attached to the shaft.

As explained more thoroughly below, the present invention provides an improved shaft configuration suitable for all types of clubs used to play the game of golf. The addition of the visible insert regulates swing weight and maximizes specific desired flex and stiffness of the shaft. The improved shaft and insert preferably also cooperate to absorb shock at impact and control the torquing and proper uncoiling of the shaft during the shot. These inserts preferably include a coil or coil-like structure which acts as a buffer and/or vibrational dampener or suppressor, thereby providing greater cushioning to reduce or eliminate undesirable vibrations and shock, especially when off-center ball contact is made or "fat shots" occur.

Further, the proper application of the insert promotes greater club head stability at impact because of a quicker recovery capability of the shaft, facilitating the return of the club face to its original "square position." The desired flexing and precision control are accomplished by selecting the materials and physical characteristics of the insert (such as the proper number of coils, and the thickness of the coils) and properly locating the insert along the shaft. The insert of the present invention can also be varied in mass, size, shape, and location, to optimize the swing weight, flex point, and stiffness of a set of clubs. By varying these parameters, the shaft and resultant club may be fitted to individual golfers or types of golfers of a wide variety of ability.

The shaft of the present invention includes an upper butt portion, an intermediate portion, a lower tip or club head portion, and an intermediate coil insert. The insert is provided with connectors on opposite ends of the coil. The connectors may be shank-type male or a receptor-type female in structure. A shank-type insert fits into the hosel socket of the club head or an adjoining shaft section, while a receptor-type connector fits over an adjoining shaft section.

The insert can either be placed in new shafts of new clubs, or can be added to existing shafts in old sets of clubs, thereby improving the old set. For example, sets of inserts of the present invention can be readily produced in standardized sets, to be sold as kits to alter an old set of clubs into an improved set of clubs having better performance. For example, the shafts of the old set can be cut at the desired location of the inserts, a short section of the shaft approximately equal to the length of the central section of the insert can be removed, and the insert can then be fixed to the remaining tip and butt portions of the shaft.

Preliminary tests conducted with iron and metal wood-type golf clubs using shafts having the coil or coil-type inserts of the present invention have produced results that were superior in feel, control, distance, and accuracy over that of conventional clubs using the same composite material or metal shafts. Golf clubs with the present invention were easier to swing and control.

The insert of the present invention is preferably formed with surface or complete coils which serve to control and develop torsion forces as the golf club is swung. For example, on the back swing, left to right rotational movement of the club creates a coiling action within the coil-type insert to create a torsion-force. On the downswing, the built up torsion-force is uncoiled in a right to left direction to develop an additional propulsion force. This additional force increases the club head speed developed by the centrifugal force of the golf swing, particularly when the flex point of the shaft is optimumly regulated by the insert.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Figure 1:
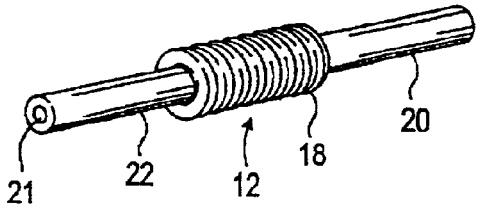
FIG. 1 shows a first embodiment of a golf club shaft insert in accordance with the present invention.
Figure 2:
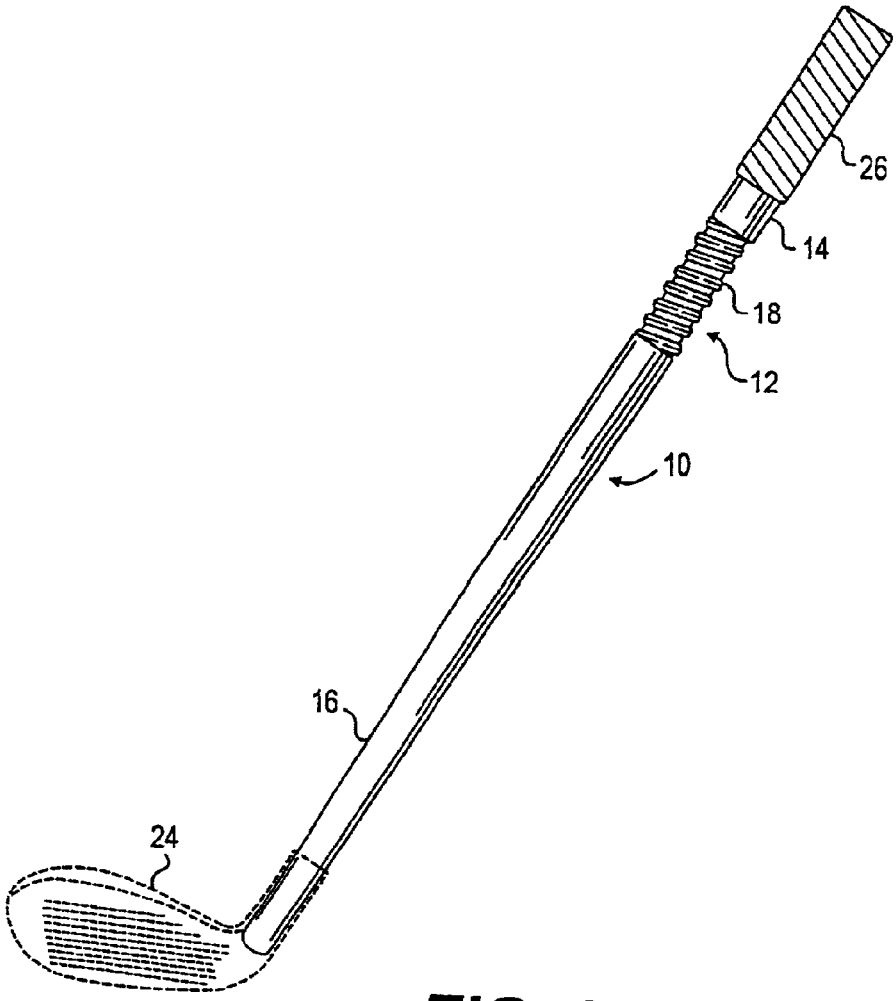
FIG. 2 is a perspective view of a golf club using a shaft in accordance with the present invention with the insert located adjacent the grip.
Figure 3:
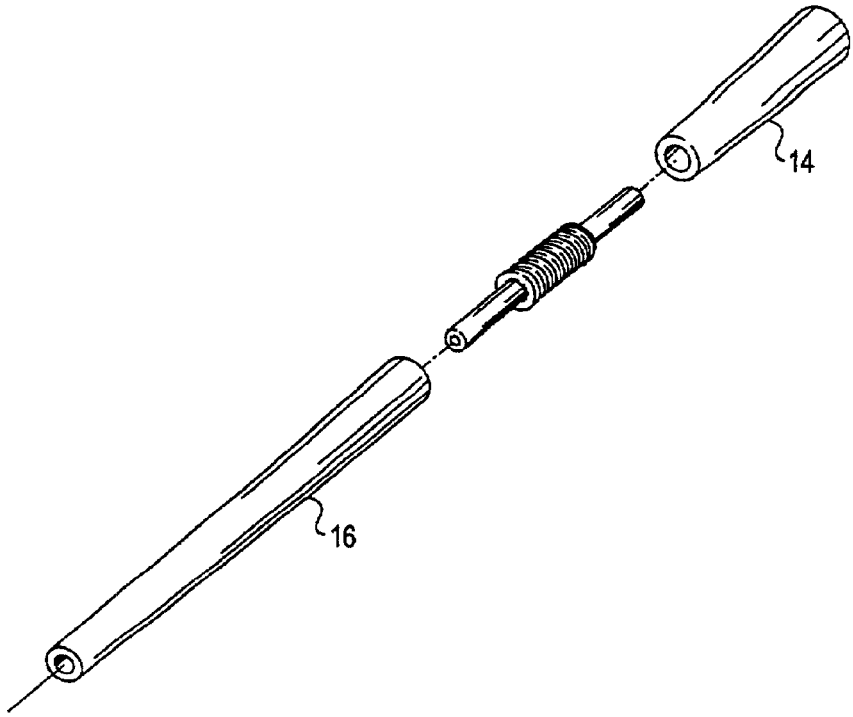
FIG. 3 is an exploded view of the shaft and coil insert of FIGS. 1 and 2.
Figure 4:
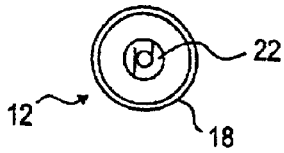
FIG. 4 is an end view of the insert of FIG. 1.
Figure 5:
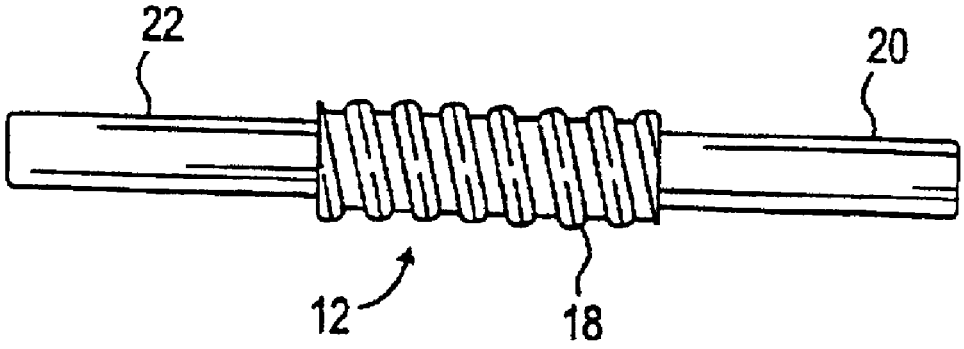
FIG. 5 is a side elevational view of the insert of FIG. 1.
Figure 6:
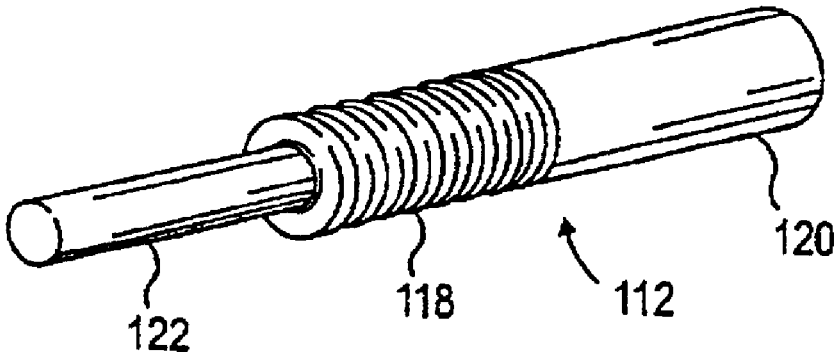
FIG. 6 is a perspective view of a second embodiment of the coil insert of the present invention.

Reference will now be made in detail to the present embodiments of the invention, and examples which are illustrated in the accompanying drawings. Wherever possible, the same reference numbers will be used throughout the drawings to refer to the same or like parts. It should be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIGS. 1–5 of the drawings, a first embodiment of the invention is illustrated. As shown insert 12 is fixed to a conventional shaft 10 of a golf club, which in turn is attached at one end to a golf club head 24 and at the other end to a conventional grip 26. The shaft 10 itself can be formed of a variety of materials such as steel, graphite, fiberglass, and various alloys and composites, as is known in the art. The insert 12 forms a coupling means between an upper grip portion 14 of the shaft 10 and a lower club head or tip portion 16 of the shaft 10.

The insert 12 can be formed of a variety of materials and in a variety of shapes and sizes, although certain materials, shapes, and sizes are preferred, as will be explained below. In all embodiments, the insert has a central section 18 connected at its opposite end to couplers 20 and 22. These couplers fit into or over the shaft 10 or the club head 24, in a manner such that a tight fit and strong connection can be made between the insert and the shaft or club head. Preferably, the insert and shaft or club head are permanently fixed to one another through the use of epoxy or a similar adhesive, although any acceptable connection technique is within the scope of the invention. It is also possible that the insert could be incorporated into an extended hosel of a club head. The central section of the insert 12 in each preferred embodiment is positioned either between the club head and the shaft or between two portions of the shaft, adds to the length of the club, and is visible when installed on the shaft. The insert preferably has a boss on a male shank connector and a recessed opening on a female receptor, against which the shaft abuts thereby ensuring that the central section of the insert is properly joined and is of the desired length.

Regardless of the particular size, shape, and mass of the insert, the addition of the insert to the shaft regulates both the swing weight and the shaft flex point and stiffness of the resultant golf club. Thus, the characteristics and location of the insert can be varied, along with the other conventional elements of the club, to provide the most optimum flex point and swing weight of a given set of clubs.

Preferably, the insert 12 is constructed in a manner which allows the insert to affect the manner in which the shaft and the entire club responds to torsional forces as the club head is swung and to shocks and vibrations when the ground or ball is hit. The central section of the insert preferably includes physical alterations in its configuration that allow the insert to absorb the shock forces generated when the ball is hit. An insert with such alterations acts as a buffer and/or vibrational dampener or suppressor, thereby reducing or eliminating the transfer of undesirable vibrations and shocks to a golfer's hands. Inserts made of certain materials may be sufficiently resilient to act as a buffer and/or vibrational dampener or suppressor, without physical alteration.

Similarly, the insert preferably includes physical alterations or configurations that allow the insert to twist or turn slightly about its axis when the club head is swung. For example, the insert can include coils or a coil-like configuration providing a feature to control torsion. Thus, on the back swing, the insert undergoes a controlled coiling action that in effect produces stored energy in the insert at or about the top of the swing. On the downswing, the built up torsion-force in the insert is uncoiled to develop and impart an additional torsion, propulsion force to the golf ball at impact. Again, inserts made of certain resilient materials may provide this feature and function, without the need for physical alterations to the insert.

The first embodiment of an insert, shown in FIGS. 1–5, includes a centrally located coil or coil-type section 18 and an upper coupling member 20 and lower coupling member 22 disposed on either side of the central section 18. The coupling members 20 and 22 are integral with the central section of the insert and are structured to be connected to the upper portion 14 and lower portion 16 of the shaft 10, respectively. In this embodiment, the connectors 20 and 22 are male shank type connectors which are structured to be inserted into the shaft opening of the respective upper and lower portions of the shaft 10. The coil 18 is designed in a helical configuration formed between the connectors 20 and 22. In this embodiment a bore 21 extends through the entire length of the insert.

The insert 12 shown in FIG. 1 can be formed of a variety of metal and non-metallic materials and can be produced through a variety of machining or molding techniques. Presently, the preferred embodiment is an insert made of metal, preferably a steel, and most preferably a lighter and at least equally strong material, such as titanium. Titanium inserts are presently most preferred, since such inserts are significantly lighter than steel and nevertheless have the necessary strength and semi-rigidity required.

As an example, an insert of the type shown in FIG. 1 can be produced from a solid cylinder of titanium. The cylinder is machined to include a plurality of helically wound partial surface coils in the central section of the insert and two male shank couplers having a lesser outside diameter than that of the central section. The coils are in the form of a continuous arcuate bead formed on the surface of the central section, which still has a common, inner cylindrical wall along its length. The insert preferably is further machined to include a bore 21 throughout its length, thereby enhancing the coil-like characteristics of the central section while also reducing the total mass of the insert. As a result, the central section absorbs shocks and also will turn slightly about its axis when subjected to torsion.

In the embodiment shown in FIGS. 1–5 the helical surface coils are not cut through the entire cross section of the insert. The invention also contemplates, however, inserts in which the coils are made from a continuous, elongated member, so that the coils are separated from one another and form an actual helical spring. Such an embodiment is shown, by means of example only, in FIGS. 19 and 20. In that embodiment, the coils are actually spaced from one another. However, the invention also contemplates the use of a spring like insert in which the respective adjacent coils are in a touching relationship with each other.

As an example of a titanium insert made according to the first embodiment of the present invention, the insert has a plurality of partial surface coils, preferably at least four, having an outside diameter at the central section of 0.530 to 0.660 inches, a thickness (from inside diameter of the central section to outside diameter of surface coil) of 0.125 to 0.170, and a coil spacing of 8 coils per inch. The coils in this embodiment have a width of approximately 0.100 to 0.125. The central section 18 preferably has a length of at least one-half inch, and the couplers 20 and 22 have a length of one to one and one half inches. The male-type shank couplers at the ends of the insert having outside diameters generally within the range of 0.370 to 0.435 inches, one coupler being slightly larger than the other. Preferably the couplers are frustroconical in shape to match the taper of the shaft into which the are inserted. For irons, the male shanks have a length of 1.250 inches and an outside diameter of 0.370 inches. For woods, the male shanks have a length of 1.250 inches and an outside diameter in the range of 0.408 to 0.435 inches. The insert preferably has a bore 24 throughout its length, preferably so that the thickness of the couplers (inside diameter to outside diameter) is approximately 0.150 to 0.170 inches. The resultant insert has a weight of 15 to 30 grams. The resultant insert can absorb shock and turn slightly relative to torque forces, and yet is sufficiently strong and semi-rigid to alter the flex point and stiffness of the shaft and allow improved club head control throughout the swing of the club.

The insert of the present invention contemplates a number of alternate materials and configurations that can provide the desired objects of the invention and meet the elements and features presented in the claims. For example, it is believed that a wide variety of sizes and shapes of inserts, including a relatively simple cylindrical central section, will provide the features of the invention regarding the regulation of the desired flex point and swing weight of a golf club. It is believed that more complex designing is necessary to achieve the preferred combined features of swing weight regulation, shock cushioning, torsion control, and flex and stiffness regulation. By means of example, the central section 18 can be machined to include a plurality of spaced coils or bands, rather than a helical configuration. Such an insert can be either machined or molded. It is further possible that an insert can be formed of special materials that provide the desired absorption and torsion characteristics through a cylindrical central section, with or without a bore. The invention thus includes all inserts that produce the claimed features provided by the specific embodiments and illustrations disclosed herein, as well as variations readily understood by the application of the principles of the invention disclosed herein.

As shown, the insert 12 in FIGS. 1–5 is located directly below the grip of the golf club. At this location, the insert adds mass to the total club, but tends to reduce, rather than increase, the swing weight of the club. As a result, the club feels lighter and is easier to swing and control. In this embodiment, it is believed that the flex point of a given shaft is moved slightly downward, as long as the insert is as rigid or more rigid than the shaft, which is preferred. The insert's location and the type of shaft can therefore be altered to produce the most optimum characteristics in flex point, stiffness, and club control. It is believed that the added feature of torque control will be essentially the same, regardless of where the insert is located along the shaft. It is believed that the shock absorbing characteristics of the invention will be more effective when the insert is located closer to the club head. These and all aspects of the invention are the subject of further embodiments and testing, with the result that the description of the specific characteristics of the invention represent the applicant's best present understandings, based upon testing to date. Those tests have shown that golf clubs with the insert of the present invention provide repeatable benefits in feel, control, and performance over conventionally shafted clubs.

Figure 7:
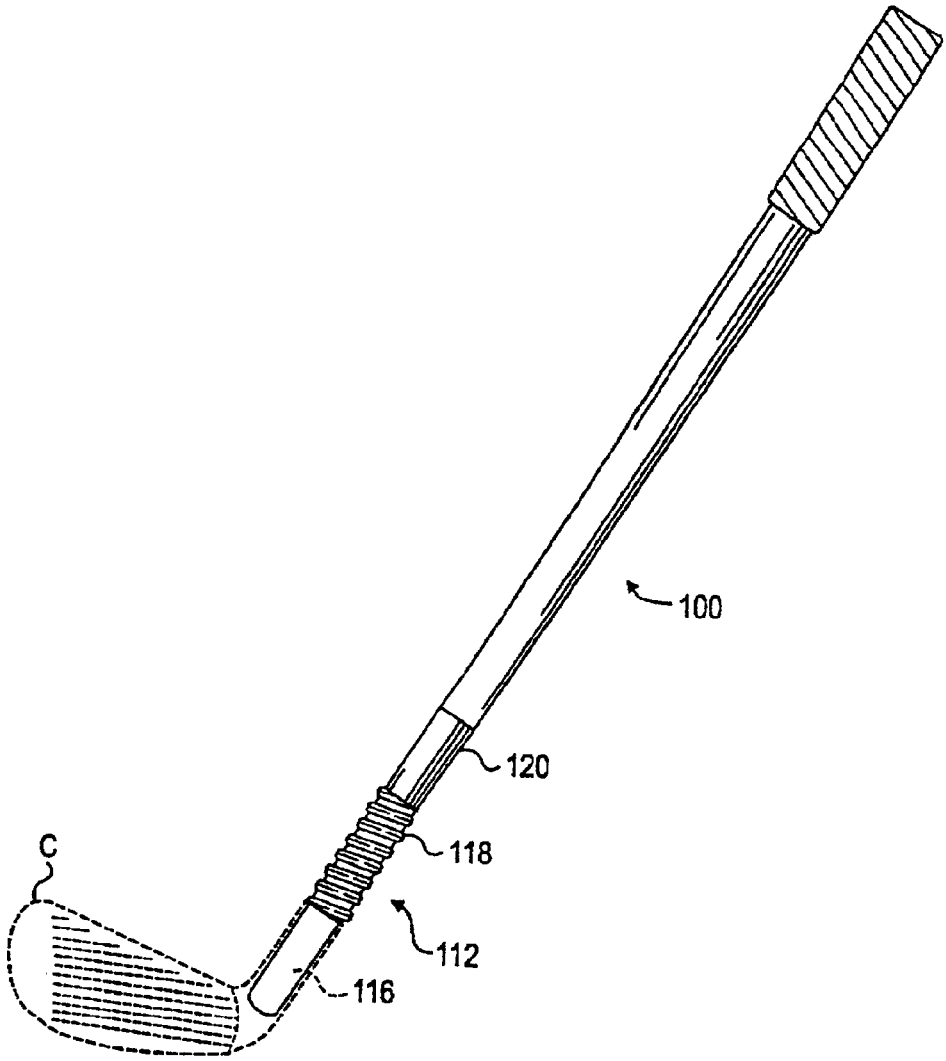
FIG. 7 is perspective view of a golf club using the shaft of the present invention with the coil insert of FIG. 6 located adjacent the club head.
Figure 8:
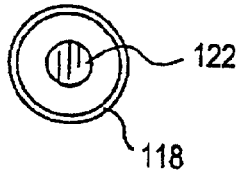
FIG. 8 is an end elevational view of the insert of FIG. 6.
Figure 9:
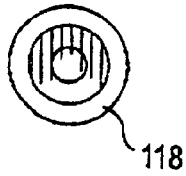
FIG. 9 is an end elevational view taken from the opposite end of FIG. 8.
Figure 10:
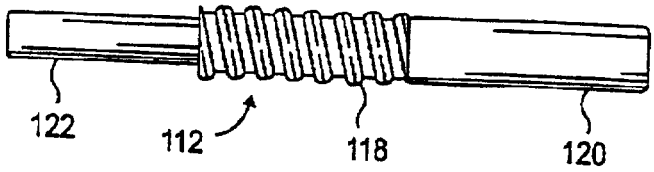
FIG. 10 is a side elevational view of the insert of FIG. 6.
Figure 11:
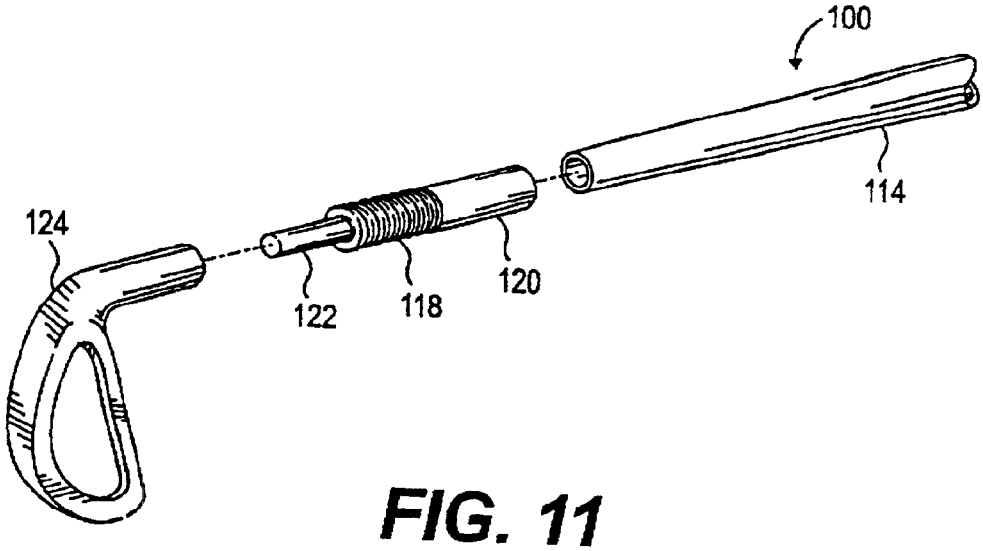
FIG. 11 is an exploded view of a golf club using the insert of FIG. 6.

FIGS. 6–11 show a golf club shaft 100 including a second embodiment of an insert 112. The insert 112 includes a coil 118, an upper female connector 120, and a lower male shank connector 122. As shown in FIG. 7, the insert 112 is positioned directly adjacent the hosel of a club head 124. The insert is preferably machined from titanium, in the manner previously taught, with the exception that the female connector has an outside diameter of approximately 0.360 and an inside bore of approximately 0.330. The diameter of the female connector will obviously vary to match the diameter, the shaft to which it will be connected. This embodiment has proven to provide excellent shock absorption characteristics, particularly for irons. While the placement of the insert at or near the club head adds to the swing weight of a given club, it also places more mass close to the ball, for greater force for a given acceleration at impact.

The present preferred placement of the insert for wood-type club heads is in the upper half of the shaft, more preferably the upper third of the shaft, and most preferably proximate (within three inches of) the bottom of the grip of a club. This placement also will work well with irons, but the inclusion of inserts at or near the club head is believed to be best for irons, particularly for a golfer having the ability to use and control clubs of a greater swing weight. For golfer having less control, the preferable position of the insert for irons will be in the upper half of the shaft.

Figure 12:
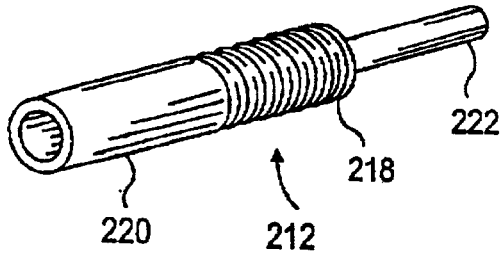
FIG. 12 is a perspective view of a third embodiment of an insert in accordance with the present invention.
Figure 13:
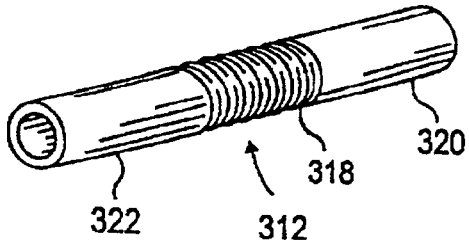
FIG. 13 is a perspective view of a fourth embodiment of an insert in accordance with the present invention.
Figure 14:
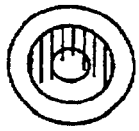
FIG. 14 is an end elevational view of the insert of FIG. 13.

FIG. 12 illustrates another embodiment of an insert 212 including a centrally disposed coil 218, an lower male shank connector 22 and upper female connector 220.

Figure 15:
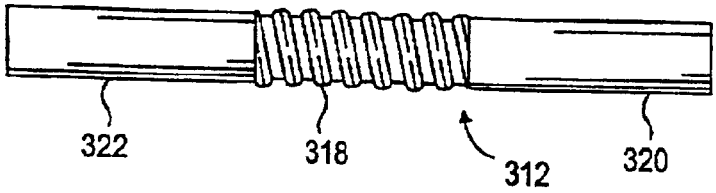
FIG. 15 is a side elevational view of the insert of FIG. 13.
Figure 15A:
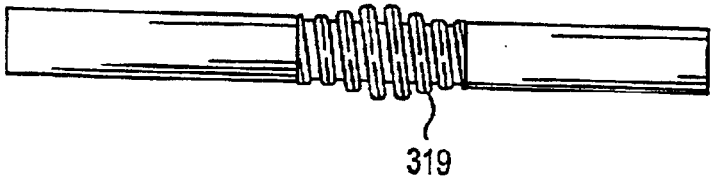
FIG. 15a is a side elevational view of a fifth embodiment of an insert in accordance with the present invention.

FIGS. 13–17 show a fifth embodiment of a golf club shaft 300 including an insert 312 having a coil 318 and an upper female connector 320 and lower female connector 322. The embodiment of FIG. 15a is similar to that of FIG. 15 except that the centrally disposed coil 319 increases in diameter from each of the female connectors to a maximum at the center of coil 324. This embodiment provides an additional manner to vary the stiffness and flexibility of the shaft.

Figure 16:
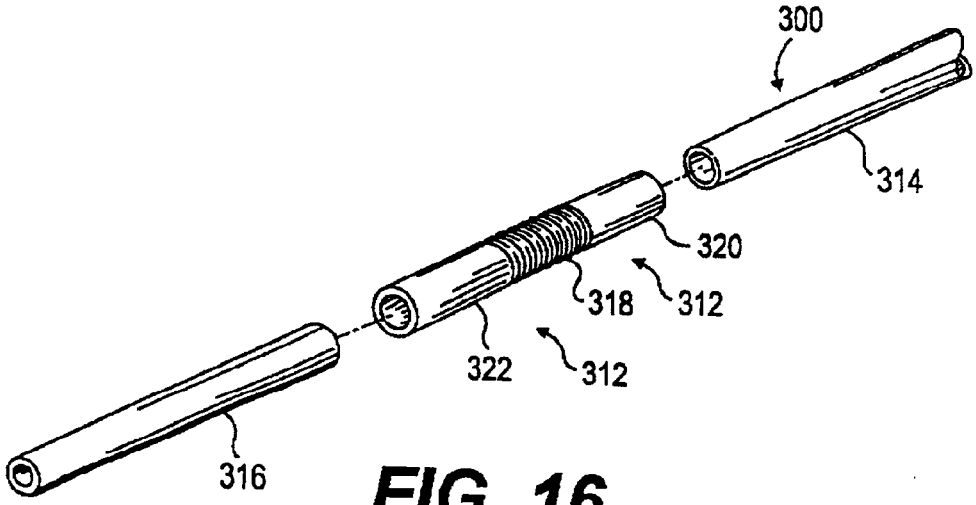
FIG. 16 is an exploded view of a golf club shaft using the insert of FIG. 13.
Figure 17:
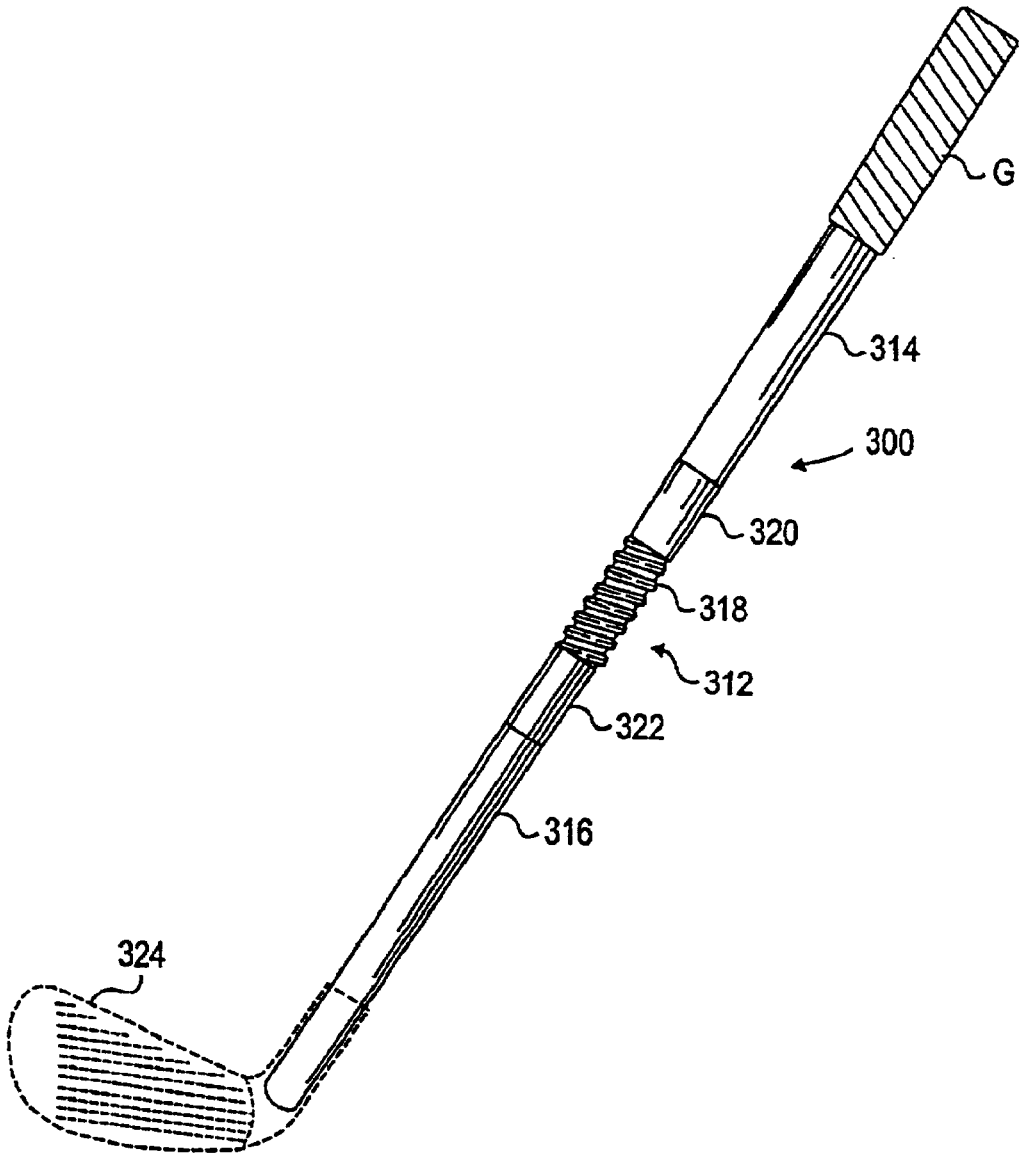
FIG. 17 is a view of a golf club using a shaft having an insert located approximately midway between the grip and club head end.

In each of these embodiments, the outside diameter of the central section can be larger for a given shaft size, since the female connector fits over the shaft. For example, as seen in FIGS. 16 and 17, an upper portion 314 of the shaft 300 fits into female connector 320, whereas a lower portion 316 of the shaft 300 fits into connector 322. In those figures, the insert 312 is placed approximately midway between the grip G and club head 324 positioning the flex point of the shaft 300 at this point.

Figure 18:
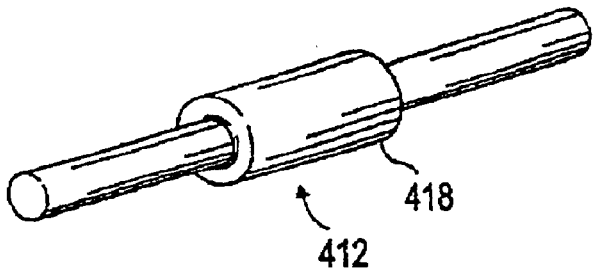
FIG. 18 shows a sixth embodiment of a golf club shaft insert in accordance with the present invention.

FIG. 18 illustrates another embodiment of the present invention wherein a shaft insert 412 includes a solid central section 418. Such insert can be made of a variety of materials and can be either a one-piece construction or a multi-piece construction. For example, an insert having this configuration and made of a relatively rigid material such as steel or titanium would produce the swing weight and flex control features of the invention but would likely not absorb shock or control or generate torsion forces. On the other hand, an insert having this configuration but made in whole or in part from a material having certain resilient qualities, could possibly provide each of these four features and still provide the necessary strength, semi-rigidity, and control. For example, this embodiment may be made from a Lexan or fiberglass composite.

Figure 19:
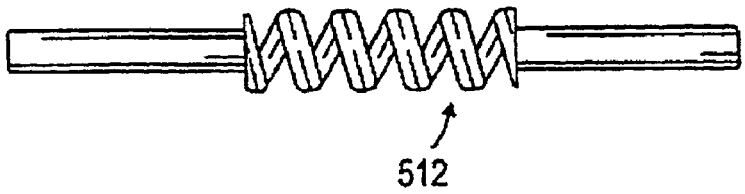
FIG. 19 shows a seventh embodiment of a golf club shaft insert in accordance with the present invention.
Figure 20:
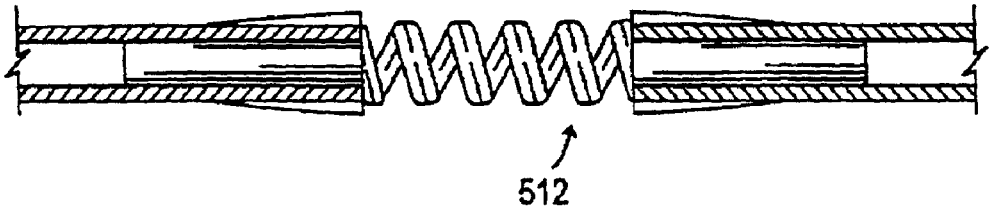
FIG. 20 is a view of a partial golf club shaft with the coil insert of FIG. 19.

FIGS. 19 and 20 illustrate another embodiment of the invention wherein a shaft insert 512 is formed by a stiff, coil spring with a male shank at each end of the stiff spring for connection to a shaft. Such an embodiment is particularly well suited to provide the shock absorption and torque control aspects of the invention.

Figure 21:
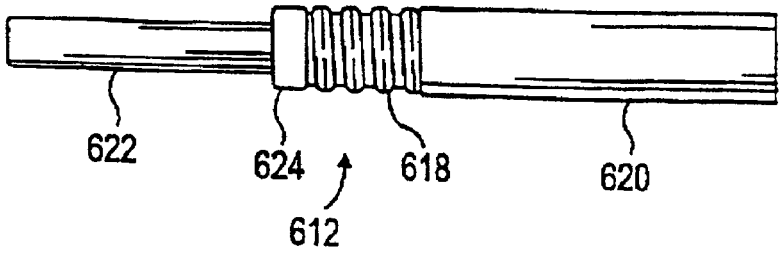
FIG. 21 shows a eighth embodiment of a golf club shaft insert in accordance with the present invention.

FIG. 21 illustrates another embodiment of an insert 612 including a centrally disposed coil 618, a lower male shank connector 622 and upper female connector 620. This embodiment is similar in shape and construction to the titanium insert previously described, except that only four (4) coils are included in the central section. It has been found that such an insert provides the torsion control and absorption features of the invention and yet is particularly light in weight. Insert 612 may also include a boss 624 on the male shank side of insert 612. Although the other embodiments shown do not depict a boss, they may also include such a boss as shown in FIG. 21.

Figure 22:
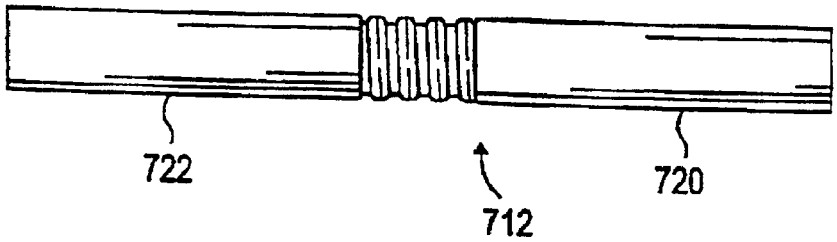
FIG. 22 shows a ninth embodiment of a golf club shaft insert in accordance with the present invention.

FIG. 22 shows a ninth embodiment [of ] according to the present invention. Insert 712 is similar to the embodiment of the insert shown in FIG. 21, except that insert 712 has an upper female connector 720 and lower female connector 722. Both inserts are similar to the insert illustrated in FIGS. 5, 10, and 13, but include only 4 coils.

Figure 23:
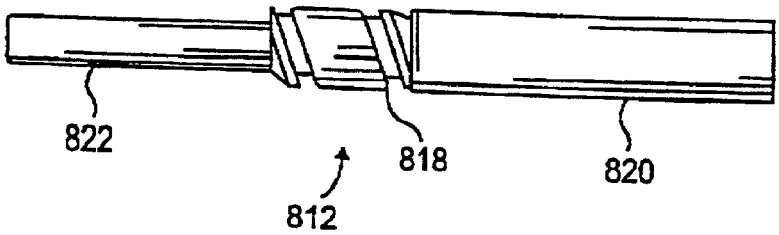
FIG. 23 shows a tenth embodiment of a golf club shaft insert in accordance with the present invention.

FIG. 23 shows a tenth embodiment of an insert according to the present invention. Insert 812 has a wide, single coil 816, a lower male shank connector 822 and upper female connector 820 as shown for the insert FIG. 21.

It will be appreciated that any combination of male shank and female connectors may be used with a shaft in accordance with the present invention depending upon a variety of parameters including shaft material and the strengths thereof as well as the desired location of the insert.

It will be apparent to those skilled in the art that various modifications and variations can be made in the golf club shaft of the present invention and in construction of this golf club shaft without departing from the scope or spirit of the invention.

I claim:

1. A golf club shaft comprising:

at least one tubular section; and a unitary insert attached to said at least one tubular section for regulating the flex point of said shaft, said insert being shorter than said tubular section and having a central section and a pair of couplers integrally formed on opposite ends of said central section, at least one of said couplers being attached to an end of said tubular section of the shaft and the central section extending axially outwardly away from the end of said tubular section, said insert being at least as rigid as said tubular section.

2. The shaft of claim 1 being further defined by two tubular sections, a first lower tubular section forming a tip end of said shaft for attachment to the golf club head and an upper tubular section forming a butt end for attachment of a grip; wherein one of said couplers is attached to said lower section and the other said couplers is attached to said upper section.

3. The shaft of claim 2 wherein said couplers are female connectors.

4. The shaft of claim 3 wherein said couplers are male shank connectors.

5. The shaft of claim 3 wherein said couplers include one male shank connector and one female connector.

6. The shaft of claim 2 wherein a grip is attached to said upper section and said insert is located within 5 inches of said grip.

7. The shaft of claim 6 wherein a grip is attached to said upper section and said insert is located within 2 inches of said grip.

8. The shaft of claim 1 wherein said central coil is formed in a series of annular rings.

9. The shaft of claim 1 wherein one of said couplers is connectable directly to the golf club head.

10. The shaft of claim 1 wherein said central section of the insert includes a plurality of helically shaped coils.

11. The shaft of claim 10 wherein said plurality of coils are surface coils formed on the surface of said central section.

12. The shaft of claim 10 wherein said plurality of coils are formed by a continuous elongated member, forming a spring-like element.

13. The shaft of claim 1 wherein said insert is made from titanium.

14. The shaft of claim 13 wherein said central section includes a plurality of helically shaped coils.

15. The shaft of claim 14 wherein said central section includes no more than 5 coils.

16. The shaft of claim 15 wherein said insert includes a hollow central bore extending along its length.

17. The shaft of claim 16 wherein said central section is no more than 1.00 inches long and said couplers are no more than 1.5 inches long.

18. The shaft of claim 1 wherein said insert includes a means for absorbing shock and cushioning vibration when a shot is executed.

19. The shaft of claim 1 wherein said insert includes a means for controlled turning about its axis in response to the torque developed by the club as it is swung.

20. The shaft of claim 1 wherein said insert includes a means for absorbing shock and cushioning vibration when a shot is executed, and for controlling turning about its axis in response to the torque developed by the shaft as it is swung.

21. The shaft of claim 1 wherein said insert includes physical alterations that allow the insert to twist or turn slightly about its axis when the club head is swung.

22. The shaft of claim 1 wherein said insert is more rigid than said tubular section of the shaft.

23. The shaft of claim 1 wherein said insert includes physical alterations in its configuration which allow the insert to absorb shock and cushion vibration when a shot is executed.

24. The shaft of claim 23 wherein said physical alterations include a hollow, central bore throughout the length of said insert.

25. The shaft of claim 23 wherein said physical configurations comprise a coil structure formed on the surface of at least a portion of said insert.

26. The golf club shaft of claim 25 wherein said insert is more rigid than said tubular section of the shaft.

27. The shaft of claim 25 wherein said coils are in the form of an arcuate bead formed on the surface of at least the central portion of said insert.

28. A golf club shaft comprising:

at least one tubular section; and a unitary insert attached to said at least one tubular section for regulating the flex point of said shaft; said insert being shorter than said tubular section and having a central section and a pair of couplers integrally formed on opposite ends of said central section, at least one of said couplers being attached to an end of said tubular section of the shaft and the central section extending axially outwardly away from the end of said tubular section, said insert including physical alterations that allow the insert to twist or turn slightly about its axis when the club head is swung.

29. The golf club of claim 28 wherein said insert is attached to the club head at one end and to the shaft at the other end.

30. A golf club comprising:

a golf club head;

a shaft having upper and lower tubular sections, one tubular section connected to the golf club head and the other tubular section connected to a grip; and means for regulating the swing weight, flex point, and stiffness of the club, said means including a unitary insert having a central section and a pair of couplers integrally formed on opposite ends of said central section, one coupler attached to the upper tubular section of the shaft and the other coupler attached to the lower tubular section of the shaft, said insert being at least as rigid as said tubular sections.

31. The golf club of claim 30 wherein said insert includes a means for controlling turning about its axis in response to the torque developed by the club as it is swung.

32. The golf club of claim 30 wherein said insert is located within 3 inches of the club head.

33. The golf club of claim 30 wherein said insert is located in the upper half of the shaft.

34. The golf club of claim 30 wherein said insert is located in the upper third of the shaft.

35. The golf club of claim 30 wherein said insert is located adjacent the grip of said clubs.

36. The golf club of claim 30 wherein said central section of said insert includes a plurality of coils.

37. The golf club of claim 30 wherein said insert is configured to absorb shock.

38. The golf club of claim 30 wherein said insert has physical alterations along at least a portion of its surface, said alterations suppressing vibration along the shaft.

39. The golf club of claim 38 wherein said insert includes a bore throughout its length to enhance the vibration-suppression of the insert.

40. The golf club of claim 39 wherein said insert is more rigid than the shaft.

41. The golf club of claim 30 wherein said insert is shorter than said tubular section and the central section of said insert extends outwardly away from opposite ends of said tubular sections.

*42. A golf club shaft having a distal end and butt end, comprising:*

*a tubular section including a first end located at the butt end of the golf club shaft and a second end positioned slightly short of the distal end of the golf club shaft;*

*an unitary insert secured to the second end of the tubular section, the insert being shorter than the tubular section, the insert extends from the second end of the tubular section to the distal end of the golf club shaft and includes a tubular first end securely coupled to the second end of the first member and a tubular second end shaped and dimensioned for secure attachment within a hosel of a golf club head;*

*the insert being formed from a vibration absorbing material which absorbs undesirable vibrations resulting from an individual striking a golf ball.*

*43. The golf club shaft according to claim 42, wherein the tubular section is made from a material chosen from the group consisting of steel, graphite and fiberglass.*

*44. The golf club shaft according to claim 42, wherein the insert is made from a lexan or fiberglass composite.*

*45. The golf club shaft according to claim 42, wherein the insert is made from titanium.*

*46. The golf club shaft according to claim 42, wherein the insert includes a central section and a pair of couplers formed on opposite ends of the central section, the central section being approximately 0.5 inch in length.*

*47. A golf club shaft having a distal end and butt end, comprising:*

*a tubular section including a first end located at the butt end of the golf club shaft and a second end positioned slightly short of the distal end of the golf club shaft;*

*a unitary semi-rigid insert secured to the second end of the tubular section, the insert being shorter than the tubular section, the insert extends from the second end of the tubular section to the distal end of the golf club shaft and includes a tubular first end securely coupled to the second end of the first member and a tubular second end shaped and dimensioned for secure attachment within a hosel of a golf club head;*

*the insert being formed from a material controlling the stiffness at the distal end of the golf club shaft upon striking a golf ball to thereby stabilize a golf club head secured to the distal end of the golf club shaft.*

*48. The golf club shaft according to claim 47, wherein the tubular section is made from a material chosen from the group consisting of steel, graphite and fiberglass.*

*49. The golf club shaft according to claim 47, wherein the insert is made from a lexan or fiberglass composite.*

*50. The golf club shaft according to claim 47, wherein the insert is made from titanium.*

*51. The golf club shaft according to claim 47, wherein the insert includes a central section and a pair of couplers formed on opposite ends of the central section, the central section being approximately 0.5 inch in length.*

* * * * *